Oct. 11, 1960   D. W. BARTON ET AL   2,955,668
POWER STEERING MECHANISM
Filed Sept. 16, 1958   4 Sheets-Sheet 1

D. W. BARTON
G. A. ULRICH
INVENTOR.

BY E. C. McRAE
J. R. FAULKNER
T. H. OSTER
ATTORNEYS

Oct. 11, 1960  D. W. BARTON ET AL  2,955,668
POWER STEERING MECHANISM
Filed Sept. 16, 1958  4 Sheets-Sheet 2
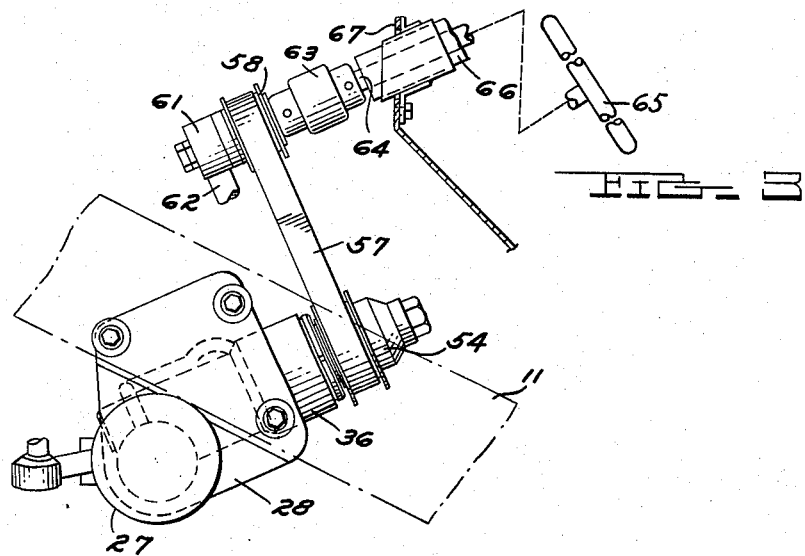
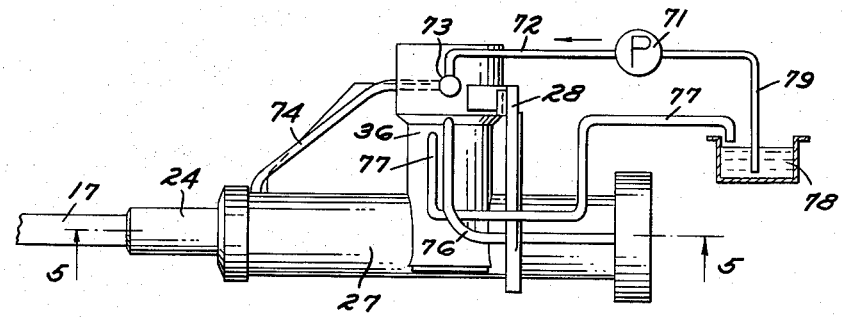
D. W. BARTON
G. A. ULRICH
  INVENTORS
E. C. McRAE
BY  J. R. FAULKNER
T. H. OSTER
  ATTORNEYS

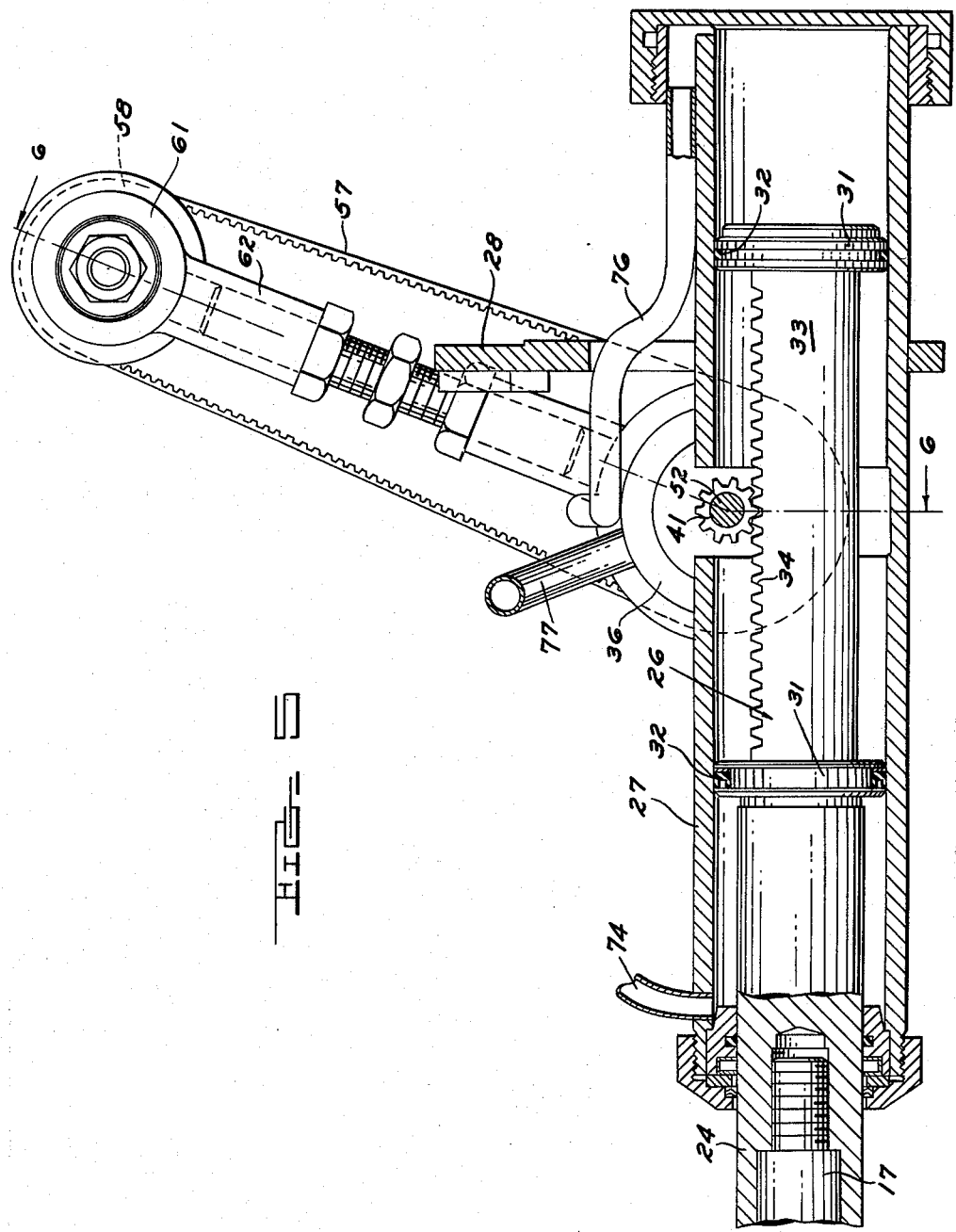

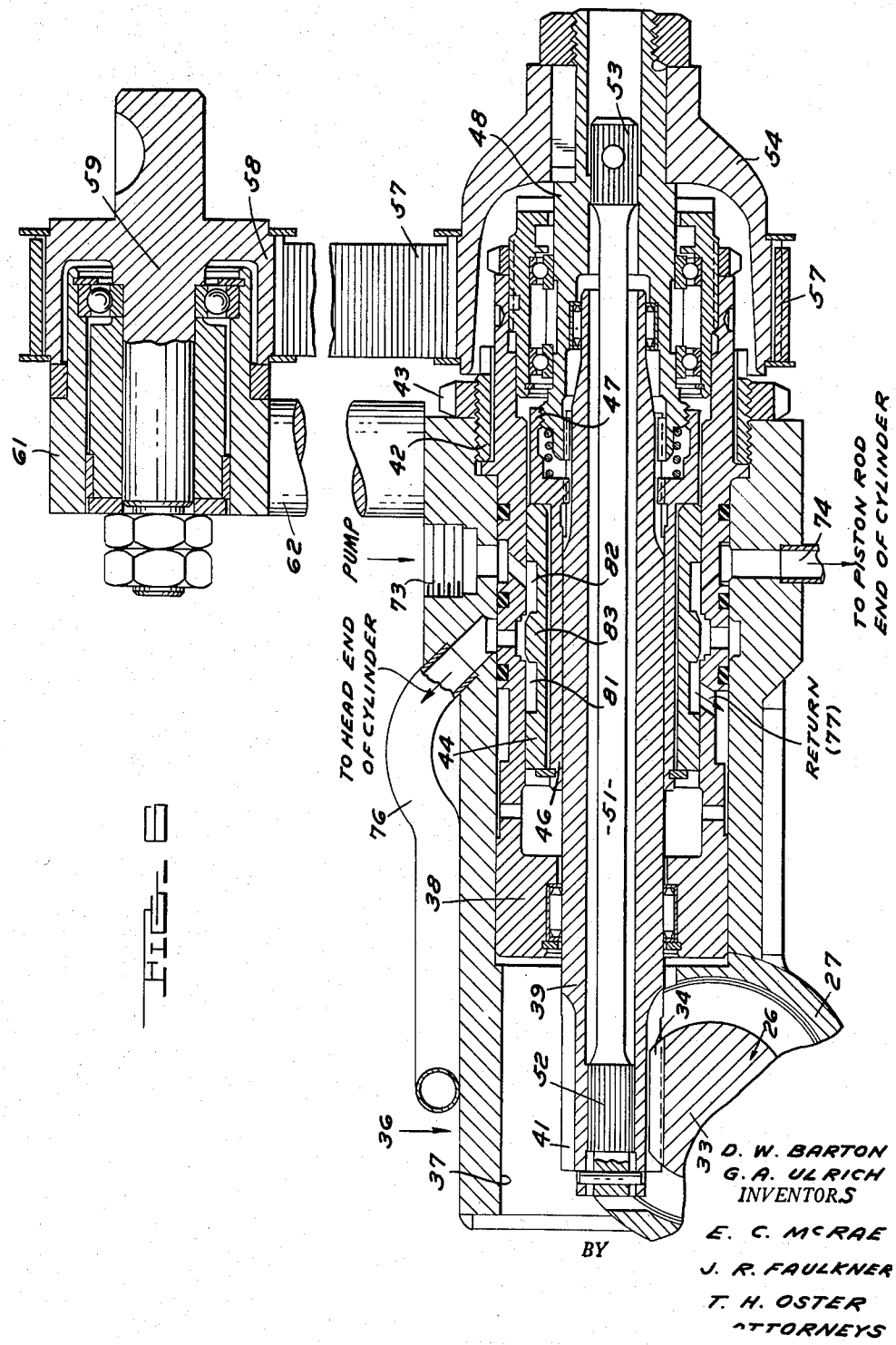

United States Patent Office 2,955,668
Patented Oct. 11, 1960

2,955,668

POWER STEERING MECHANISM

David W. Barton, Birmingham, and Glenn A. Ulrich, Garden City, Mich., assignors to Ford Motor Company, Dearborn, Mich., a corporation of Delaware Filed Sept. 16, 1958, Ser. No. 761,385

11 Claims. (Cl. 180—79.2)

This invention relates generally to power steering mechanisms for motor vehicles and has particular reference to a hydraulic power steering mechanism of the rack and pinion type.

In an embodiment of the present invention a power steering cylinder is mounted upon the vehicle frame at one side thereof and extends transversely with a guided extension of the piston rod being connected to the steering linkage to steer the vehicle road wheels. The piston carries a toothed rack within the cylinder and the latter is engaged by a pinion on a pinion shaft journaled in an extension of the cylinder housing projecting at right angles therefrom. The hydraulic valve means and the valve actuating means are contained within the housing extension generally concentric with the pinion shaft. The axis of the cylinder housing extension and the pinion shaft and valve mechanism may be offset radially from the axis of the steering column and operatively connected thereto by means of a flexible driving belt or other flexible connection.

The steering mechanism of the present invention is adapted to be compactly arranged adjacent the steering linkage and may be relatively economically manufactured and fabricated. With the flexible driving arrangement it need not be arranged in alignment with the axis of the steering column and yet the mechanism provides for effective power steering as well as manual steering in the event of failure of the power mechanism.

Other objects and advantages of this invention will be made more apparent as this description proceeds, particularly when considered in connection with the accompanying drawings, in which:

Figure 4 is an enlarged plan view of the power steering mechanism;

Figure 5 is a cross section on the line 5—5 of Figure 4;

Figure 6 is a cross section on the line 6—6 of Figure 5; and

Figure 7 is an enlarged plan view, partly in section, of a portion of the construction shown in Figure 1.

Figure 1:
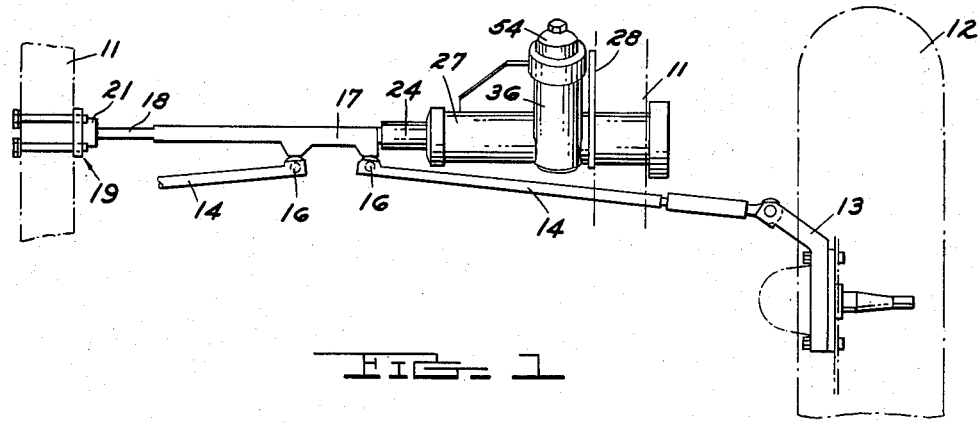
Figure 1 is a semi-diagrammatic plan view of a portion of a motor vehicle chassis incorporating the present invention.
Figure 2:
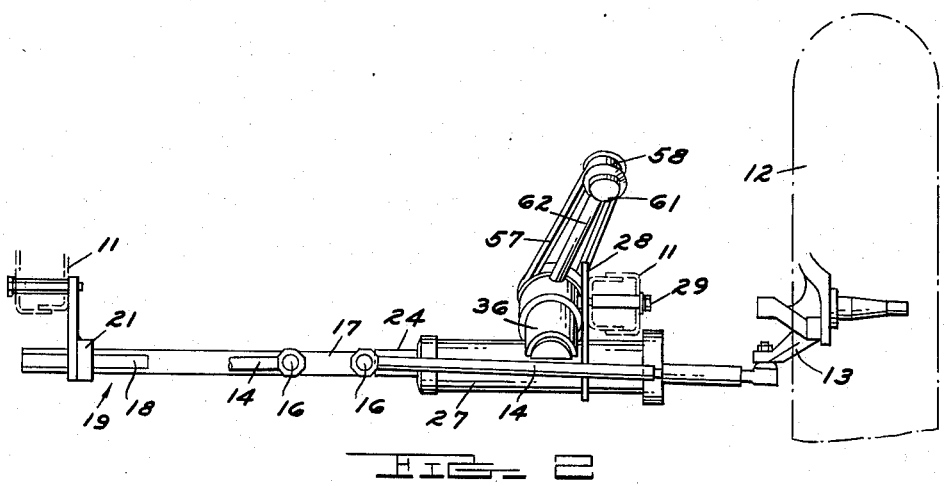
Figure 2 is a front elevational view of the structure shown in Figure 1.

Referring now to the drawings, the reference character 11 indicates the longitudinally extending side frame rails of a motor vehicle frame. A pair of steerable front road wheels 12 are conventionally suspended upon the vehicle frame, and are steered by means of conventional steering arms 13 and transversely extending tie rods 14. The tie rods 14 are connected by ball joints 16 to a transversely extending cross rod 17.

At one end the cross rod 17 is formed with a flattened portion 18 extending through a guide bracket 19 depending from the adjacent side frame rail 11, as best shown in Figure 7. The bracket 19 has a housing part 21 containing a nylon bushing 22 supported in a rubber mounting 23 and slidably but nonrotatably engaging the flattened end portion 18 of the cross rod 17. This construction guides one end of the cross rod 17 and freely permits reciprocation thereof in a transverse direction, while at the same time preventing rotation of the cross rod 17 under the loads imposed upon the cross rod 17 by the tie rods 14.

As best seen in Figure 5, the opposite end of the cross rod 17 is threaded and is received within the internally threaded end of a piston rod 24. The piston rod 24 forms an extension of a spool shaped piston 26 reciprocably mounted within a power cylinder 27. The power cylinder 27 extends transversely of the vehicle with the outboard end thereof located beneath the side frame rail 11. A vertical mounting bracket 28 is provided on the cylinder 27, and is adapted to be secured by bolts 29 to the inboard side of the side frame rail 11 to fixedly mount the power cylinder in position.

The piston 26 is formed with end flanges 31 provided with sealing rings 32 and with a reduced central portion 33 interconnecting the ends 31 and formed with a toothed rack 34 along one edge thereof.

The power cylinder 27 is formed with an integral valve housing 36 projecting at right angles from approximately the central portion thereof and extending in an inclined direction generally rearwardly and upwardly from the cylinder. As best seen in Figure 6, the valve housing 36 is formed with a bore 37 receiving an annular valve body 38 which in turn rotatably receives a hollow pinion shaft 39 having a small diameter pinion 41 formed at one end thereof and meshing with the rack teeth 34 on the piston. The pinion shaft 39 is mounted eccentrically within the valve body 38 and the latter may be rotatably adjusted to adjust the pinion 41 to eliminate backlash between the pinion and the rack. Lock nuts 42 and 43 secure the valve body 38 in adjusted position.

The housing 36 contains valve mechanism and valve actuating mechanism more fully described in the copending application of Warren A. Van Wicklin, Jr. entitled, Power Steering Mechanism, Serial No. 761,383, now abandoned, and having a common assignee with the present application. In general, the valve mechanism includes a valve spool 44 reciprocable within the valve body 38 and carried by a valve actuator sleeve 46. The sleeve 46 in turn is splined to the pinion shaft 39 and has helical teeth 47 meshing with corresponding teeth on a driven sleeve 48 journaled in the end of the valve housing 36.

A torsion rod 51 extends through the hollow pinion shaft 39 and has its lower end 52 splined to the lower end of the shaft adjacent the pinion 41. The upper end 53 of the torsion rod is splined to driven sleeve 48, and it will be apparent that when a steering effort is applied to the driven sleeve 48 the torsion rod 51 may twist due to the resistance of the road wheels and that this will result in relative rotation between the meshing teeth on the driven sleeve 48 and the valve actuator sleeve 46 to reciprocate the valve spool 44 to direct fluid to one end or the other of the power cylinder 27.

The driven sleeve 48 has secured thereto a toothed sprocket 54 engaging teeth formed on the internal surface of a flexible driving belt 57. The belt may be formed of steel reinforced rubber to provide strength yet flexibility. The belt also meshes with a toothed sprocket 58 having a supporting shaft 59 journaled within a hub 61. The hub 61 is supported upon the valve housing 36 by means of an adjustable strut 62. As shown strut 62 is adjustable lengthwise to vary the tension on the driving belt 67.

Figure 3:
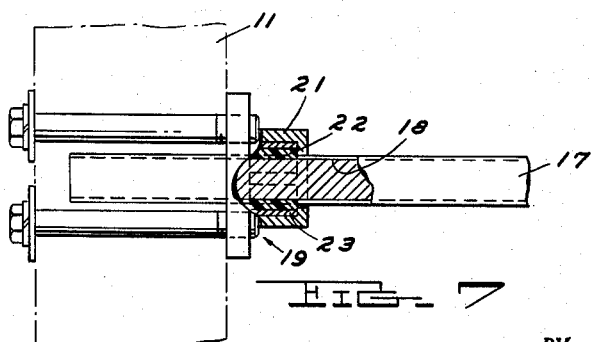
Figure 3 is a side elevational view of a portion of the structure shown in Figure 1.

Referring to Figures 3 and 6, the shaft 59 is keyed to a flexible coupling 63 which in turn is connected to the lower end of a steering post 64 journaled within the steering column 66. The steering column 66 extends through the vehicle fire wall 67, and is supported thereby, and at its upper end is conventionally supported on the vehicle dash (not shown). The upper end of the steering post carries a conventional steering wheel 65 for manual operation by the vehicle driver.

It will be noted that the axis of the steering column 66 extends generally parallel to the axis of the valve actuating mechanism contained within the valve housing 36, but that the steering column is offset radially both upwardly and laterally outwardly from the valve mechanism. This enables the steering column to be located in the proper position and at the proper angle for the convenience of the vehicle operator yet enables the power steering mechanism to be most effectively located for proper control of the steering linkage, and in a position providing accessibility and without interferring with other vehicle components.

With reference now to Figure 4, the power steering mechanism is supplied with fluid under pressure from a pump 71 through a conduit 72 to a port 73 on the valve housing 36. The port 73 also communicates with the piston rod end of the cylinder 27 through a conduit 74. A conduit 76 extends from the valve housing 36 to the head end of the cylinder 27. A fluid return from the valve housing 36 is provided by a return conduit 77, which leads to a reservoir tank 78. The tank supplies fluid to the pump 71 through a conduit 79.

Referring now to Figure 6, valve spool 44 has peripheral grooves 81 and 82 separated by a land 83. The valve spool is shown in neutral position (straight ahead driving), and the valving is open to permit free fluid circulation. When the valve spool 44 is moved to the left the land 83 restricts flow to the return groove 81, and pressure from the pump is supplied to both ends of the power cylinder through the conduits 74 and 76. Since the effective area at the head end of the piston is greater than at the piston rod end, the piston will be moved to the left in Figure 5 to steer the vehicle in one direction. When the valve spool 44 is moved to the right in Figure 6, pump pressure is supplied through the conduit 74 to the piston rod end of the piston, while the head end of the piston is connected to the return conduit 77 to the reservoir tank. This results in moving the piston to the right as shown in Figure 5, resulting in steering the vehicle in the opposite direction. Since the area of the piston rod 24 is approximately half the area of piston head 31, this construction provides equal steering action in both directions, as described more in detail in the copending application of Warren A. Van Wicklin, Jr., mentioned above.

It will be understood that the invention is not to be limited to the exact construction shown and described, but that various changes and modifications may be made without departing from the spirit and scope of the invention, as defined in the appended claims.

What is claimed is:

1. Power steering mechanism for a motor vehicle having a frame and a pair of steerable road wheels, a cylinder disposed transversely of said vehicle and supported upon said frame at one side thereof, a piston reciprocable in said cylinder, a rod connected to said piston and extending from one end thereof, means on said frame guiding the opposite end of said rod for controlled movement in a transverse path, connecting means between said rod and said road wheels to steer the latter as said rod is reciprocated, a toothed rack in said cylinder movable with said piston, said cylinder having an extension housing part projecting at substantially a right angle thereto, a shaft rotatably mounted in said housing part, a pinion on said shaft meshing with said toothed rack, a source of fluid pressure, valve means carried by said housing part for selectively directing fluid from said source to opposite ends of said cylinder to actuate the latter, a manually operable steering member, and means connecting said steering member to said pinion shaft and to said valve.

2. The structure defined by claim 1 which is further characterized in that said toothed rack is formed on an intermediate part of said piston and said housing part projects from said cylinder adjacent the center portion of said rack when the road wheels are in a straight ahead position, said steering member comprising a steering wheel and a steering post secured thereto with the axis of said post being offset materially from the axis of said housing part, and a flexible driving element interconnecting said steering post and said pinion shaft.

3. The structure defined by claim 2 which is further characterized in that the axes of said steering post and said pinion shaft are parallel to each other but materially offset radially from each other, radially aligned gears operatively connected to said steering post and said pinion shaft, and a flexible toothed belt forming a driving connection between said gears.

4. Power steering mechanism for a motor vehicle having a frame and a pair of steerable road wheels, a cylinder disposed transversely of said vehicle and supported upon said frame at one side thereof, a piston reciprocable in said cylinder, a rod connected to said piston and extending from one end thereof, means on said frame guiding the opposite end of said rod for controlled movement in a transverse path, connecting means between said rod and said road wheels to steer the latter as said rod is reciprocated, a toothed rack in said cylinder movable with said piston, said cylinder having an extension housing part projecting at substantially a right angle thereto, a shaft rotatably mounted in said housing part, a pinion on said shaft meshing with said toothed rack, a source of fluid pressure, valve means carried by said housing part for selectively directing fluid from said source to opposite ends of said cylinder to actuate the latter, a manually operable steering member, a driven part concentric with said pinion shaft and operatively connected to said steering member to be driven thereby, a lost motion flexible connection between said driven part and said pinion shaft, a pair of relatively axially movable elements operatively connected to said driven part and said pinion shaft respectively and having interengaging cam portions effecting said relative axial movement upon manual operation of said steering member and distortion of said flexible connection resulting from the steering load on said road wheels, and means connecting one of said relatively axially movable elements to said valve means to operate the latter.

5. The structure defined by claim 4 which is further characterized in that said flexible connection comprises a torsion bar and said valve means comprises an axially reciprocable valve spool concentrically surrounding said torsion bar.

6. Power steering mechanism for a motor vehicle having a frame and a pair of steerable road wheels at opposite sides of said frame, a transversely extending power cylinder supported upon said frame, a piston reciprocable within said cylinder and having a toothed rack part associated therewith within said cylinder, a rod part operatively connected to said piston and said rack part and projecting from said cylinder in axial alignment therewith, linkage connecting said rod part to said steerable road wheels, a shaft rotatably mounted at right angles to said cylinder, a pinion on said shaft meshing with said rack, a manually operable steering wheel, a steering column for said steering wheel mounted upon said vehicle with its axis parallel to and radially offset materially from the axis of said pinion shaft, and a flexible driving element connecting said steering column and said pinion shaft.

7. The structure defined by claim 6 which is further characterized in that said pinion shaft projects from substantially the central portion of said power cylinder and is inclined upwardly and rearwardly therefrom at right angles thereto, said steering column extending generally parallel to said pinion shaft and being offset upwardly and laterally outwardly from said pinion shaft.

8. The structure defined by claim 7 which is further characterized in that said driving and driven gears are operatively connected to said steering column and said pinion shaft respectively, and a flexible toothed driving belt connecting said gears.

9. The structure defined by claim 6 which is further characterized in that said vehicle frame has a pair of longitudinally extending side frame rails, means supporting said power cylinder on one of said side frame rails, guide means mounted upon the other of said side frame rails and having slidable but nonrotatable connection with said rod part to guide the transverse reciprocation of the latter and to prevent rotation of the latter under the loads imposed thereon by said steering linkage.

10. The structure defined by claim 6 which is further characterized in that said cylinder has a housing extension, having a bore therein extending at right angles to the axis of said cylinder, a fixed valve sleeve in said bore, said pinion shaft being journaled eccentrically within said valve sleeve, means for rotating said sleeve to adjust the meshing engagement of said pinion with said rack, and a reciprocable valve spool within said sleeve.

11. Power steering mechanism for a motor vehicle having a frame and a pair of steerable road wheels, a cylinder disposed transversely of said vehicle and supported upon said frame at one side thereof, a piston reciprocable in said cylinder, a rod connected to said piston and extending from one end thereof, means on said frame guiding the opposite end of said rod for controlled movement in a transverse path, connecting means between said rod and said road wheels to steer the latter as said rod is reciprocated, a toothed rack in said cylinder movable with said piston, said cylinder having an extension housing part projecting at substantially a right angle thereto, a shaft rotatably mounted in said housing part, a pinion on said shaft meshing with said toothed rack, a source of fluid pressure, valve means carried by said housing part for selectively directing fluid from said source to opposite ends of said cylinder to actuate the latter, a manually operable steering member, a driven part concentric with said pinion shaft and operatively connected to said steering member to be driven thereby, a lost motion flexible connection between said driven part and said pinion shaft, a pair of relatively movable elements operatively connected to said driven part and said pinion shaft respectively and having interengaging portions effecting said relative movement upon manual operation of said steering member and distortion of said flexible connection resulting from the steering load on said road wheels, and means connecting one of said relatively movable elements to said valve means to operate the latter.

References Cited in the file of this patent
UNITED STATES PATENTS

| | | |
|---|---|---|
| 1,872,714 | Farley | Aug. 23, 1932 |
| 2,865,339 | Bishop | Dec. 23, 1958 |
| 2,867,284 | Hruska | Jan. 6, 1959 |
| 2,869,664 | Utter | Jan. 20, 1959 |